March 20, 1945. S. H. PHILLIPS ET AL 2,371,913
TUBE CLOSURE
Filed Nov. 8, 1943
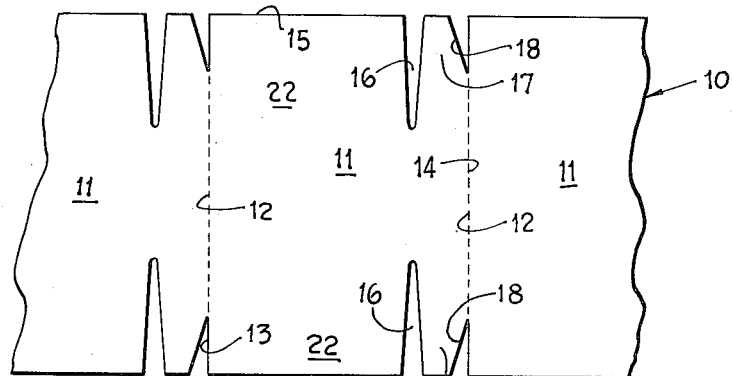
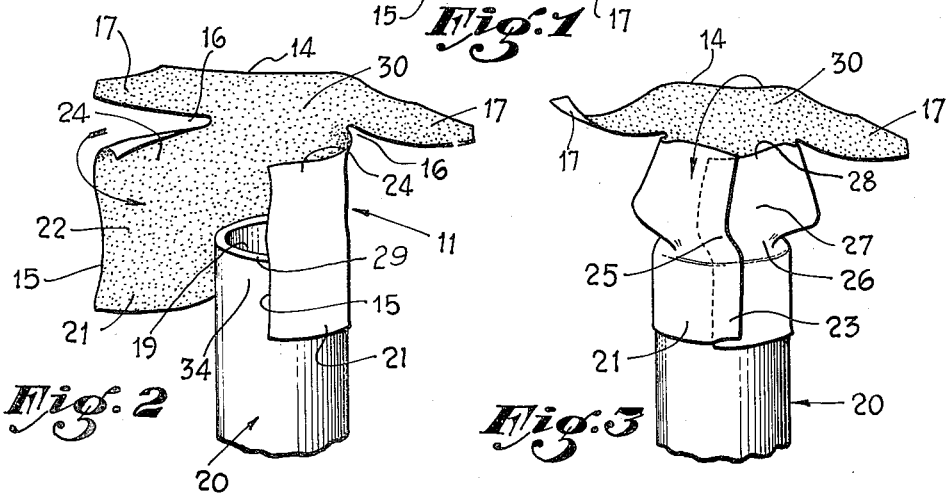
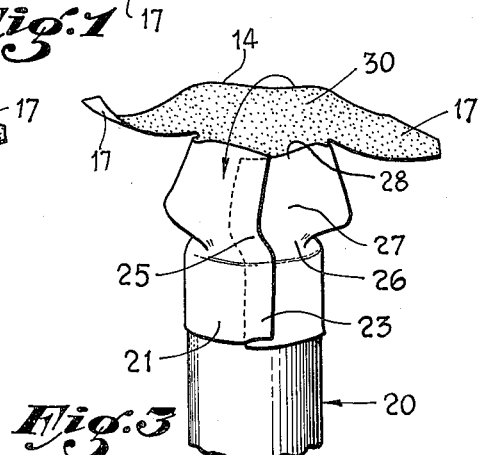
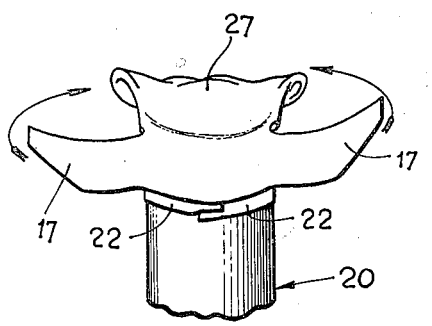
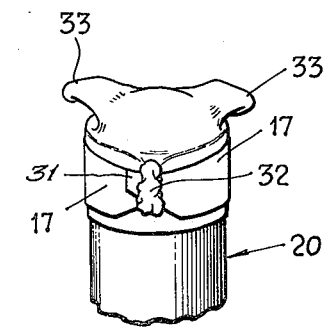
SYDNEY H. PHILLIPS
CARL C. WISBERG
INVENTORS.
BY Edwin Coates
ATTORNEY Patented Mar. 20, 1945

2,371,913

UNITED STATES PATENT OFFICE 2,371,913

TUBE CLOSURE

Sydney H. Phillips, Los Angeles, and Carl C. Wisberg, El Segundo, Calif., assignors to Douglas Aircraft Company, Inc., Santa Monica, Calif.

Application November 8, 1943, Serial No. 509,526

9 Claims. (Cl. 138—96)

This invention relates to sealing closures for closing the open ends of tubes, pipes and conduits and especially for the temporary closure thereof incidental to the fabrication of vehicles or other devices in which tubing, piping and conduits are extensively used. In the manufacture, for instance, of aircraft, in one unit of which several hundred separate pieces of tubing and piping may be used, it is the common practice for many of the parts and equipment of the unit to be manufactured by contractors and shipped to the aircraft manufacturer's assembly plant. In this manner, thousands of pieces of tubing and piping are manufactured and may remain as separate unassembled articles during transportation and storage for a period of weeks or months. Similar conditions prevail in the manufacture of automotive vehicles, watercraft and many forms of stationary machinery. Even when pieces of tubing are initially manufactured and finally assembled at the same location, there is a period of time intervening between the manufacture of the tubing and its installation, during which it may be placed in storage or may be subjected to testing procedure.

During this period it is essential that the ends of the tube be protected from deformation, that the internal surface of the tube be protected from the detrimental action of moisture, salt air, or other substance, that the entry of dirt, grease, or other foreign objects into the interior chamber of the tube be prevented and that in general the tube be in the same clean, perfect condition at the time of installation in which it was when initially manufactured.

Accordingly, it is the object of this invention to provide a sealing closure for temporarily closing the ends of tubes, pipes or other conduits which is inexpensive of manufacture, readily applied, of sufficient strength to serve its purpose, durable, adequately protective of the end edges, of the tube and which will not become brittle with age with the result that pieces thereof break off and fall into and become lodged in the tube. Since these tubes, pipes and other conduits are used for conveying water, hydraulic oil, lubricating oil, compressed air and other fluids in securing the performance of vitally important functions of the machinery and equipment of the aircraft or other machine in connection with which it is being used, it is particularly important to prevent the entrance of any foreign objects within the tube prior to its use for its intended purpose.

It is another object to provide a closure of such material and so constituted that it will be resistant to the passage therethrough of water, if not in fact fully waterproof, and that it will be reasonably resistant to abrasive wear.

It is also an object of the invention to provide a tube closure which may be readily bonded with the tube in such a manner as to provide a durable air tight and water tight joint, and which yet will be cleanly separable from the tube when it is desired to remove the closure at the time of installation of the tube, even though the closure has been in position for many months.

It is a still further object of the invention to provide a seal or closure which, in addition to fulfilling the objects stated above, is capable of being used several times.

Still another object of the invention is to provide a temporary closure for tubing of such a form that it may not be removed without evidence being given of such removal. In war time and often under other conditions it is desirable that an inspector be able to tell at a glance that a tube has been sealed and protected in the interval between manufacture and installation and that its interior is in the same condition at the end as at the beginning of this period.

Another object of the invention is to provide a closure which will withstand a moderate fluid pressure head, such, for instance, as might be applied to the closure if it were at the lower end of a long vertically disposed tube filled with water.

It is also an object of the invention to provide a closure which is so shaped as to prevent the inadvertent telescoping of a tube to which the closure is applied, within a second slightly larger tube. Should this telescoping occur, the two tubes might quite likely be installed and used for a single continuously walled tube. From the joint between such telescoped tubes fluid might escape or the unremoved cap on the inner of the two tubes might cause a stoppage of the line.

While the invention is illustrated herein by a temporary closure, certain features of the invention may be incorporated in a permanent closure for tubing.

Other objects and advantages of the invention will appear from a reading of the following description of the invention in connection with the accompanying drawing. The description and drawing are of one embodiment of the invention. The invention is not limited to this particular embodiment but has the scope defined in the claims which follow this description.

In the drawing:

Figure 1 is a fragmentary plan view of a portion of a ribbon of the sealing closures of this invention prior to use upon tubing.

Figure 2 shows one of the closures in an initial stage of the procedure of applying it to a tube end.

Figures 3 and 4 show the closure in two successive later stages of the application procedure.

Figure 5 shows the closure in its final position upon the tube.

For ease of manufacture and convenience of handling, the closures are supplied in ribbons, a portion of one of which is shown in Figure 1 and designated by the numeral 10. This ribbon is stamped to provide a plurality of sealing closures 11, secured together at the perforated lines 12, 12. Each closure is generally rectangular in form with an inner end edge 13 at a perforated line 12, an outer end edge 14 at the next perforated line 12, and side edges 15.

The closure is formed with a pair of transversely aligned notches 16 extending toward the longitudinal center line of the ribbon, the length of each notch being about one third the width of the ribbon which is also the width of the closures which form the ribbon. These notches provide a pair of oppositely and laterally outwardly extending tongues 17. Preferably the extreme outer end corners of the closure sheet are bevelled at 18 to facilitate the tearing of the closure sheet from the ribbon.

After being thus manufactured, the ribbon 10 is wound into a roll for ease of shipment, handling and storage. While the qualities of the sheeted material of the ribbon may vary in some respects within the limits of the invention, it is characterized by substantial tensile strength, by flexibility and by an adhesive facing on one side only.

Preferably the adhesive substance of this facing is of the "Scotch tape" or cleanly separable type. It causes a fairly strong water tight and air tight bond between the closure sheet and the surface of the tubing or the non-adhesive or adhesive surface of another closure sheet, but permits the ready separation of the closure sheet from the bonded surface upon the application of a substantial pulling force and without any appreciable amount of the adhesive substance being left behind. The sheet itself is preferably plastic impregnated and backed with textile material like that manufactured and known to the trade as "non-rubber Plastic Masko." Obviously it is preferable that the ribbon 10 be rolled with the adhesive surface inward.

In applying one of the closures 11 to an open end 19 of a tube 20, an inner end portion 21 of the rectangular portion 22 of the closure sheet 11 is wrapped around the cylindrical end surface 34 of the tube 20, the edges 15 forming an adhesively bonded overlap 23 extending longitudinally of the tube and closure as shown in Figure 3. The remainder of the rectangular portion 22 may be termed the other or outer end portion 24 thereof. Its length is preferably, although not necessarily, approximately equal to the diameter of the tube 20. As the portion 21 is wrapped around the tube, the portion 24 naturally forms itself into a tubular projection of the portion 21, extending beyond the tube end 19. The tongues 17 extend loosely outwardly from this projection as shown in Figure 2.

The tubular shaped portion 24 is then collapsed by manual pressure of the workman's thumb and finger to form a single layered wall 26 in the plane of the tube end 19 (Figure 3) and a double layered wall 27 extending outwardly in a chordal plane of the tube which is generally parallel to the diametral plane of the tube in which lies the overlap 23. This chordal plane is usually also a diametral plane of the tube. The walls 26 and 27 are characterized by an extension 25 of the bonded overlap 23. The tongues 17 still extend outwardly as shown in Figure 3.

The double layered wall 27 is then folded down on that half of the single layered wall 26 which has the overlap 25, preferably bringing the outer edge 28 of this double layered wall approximately into a position in which it is tangential to the end edge 29 of tube 20. The extreme outer end portion 30 and the tongues 17 are bent down over the end edge 29 of the tube and their adhesive surface brought into contact with the portion 21 of the closure sheet, the tongues 17 extending circumferentially in opposite directions around the tube, their tips overlapping at 31, where if desired the application of a small body 32 of an inflexible, readily frangible sealing material will prevent removal of the closure without evidence being given of such removal. The ears 33 shown in Figures 4 and 5 which results from the manner of applying the closure, prevent telescoping of two tubes of nearly the same diameter and protect the end edges of the tube from which they project.

The procedures of applying and removing the closure and the effective manner in which it performs its functions of mechanically closing, of fluid tight sealing and of preventing marring of the tube are evident from the foregoing description. The material and fabrication of the closure is inexpensive. The closures are readily handled and stored in roll form prior to use. The material is strong and water resistant and applied in a manner to securely mechanically close the tube end and to attach it in an effectively fluid tight fashion to the tube. The double layered wall around the cylindrical outer surface at the tube end, the ears 33 and the wear resisting nature of the sheeted material from which the closure is made provide protection to the end edges and end surfaces of the tube from marring and deformation. Since the adhesive material with which the closure sheet is faced is cleanly separable from the tube surface, the latter will take paint or other surfacing material after removal of the closure and the closure may also on that account be reused a number of times since the adhesive material is not diminished and there is nothing about either the procedure of applying the closure or the removal procedure to prevent its reverting to its original condition after a period of use on a tube end.

The invention is defined in the following claims which determine its scope and nature, irrespective of any limitations characterizing the particular form of closure herein described.

We claim:

1. A closure for sealing the open end of a tube comprising a flexible sheet of a width greater than the circumference of said tube having an end portion extending about and adhesively secured to the exterior surface of said tube adjacent the open end thereof, the portion of said sheet projecting outwardly from the end of said tube being folded back to overlie the end portion extending about said tube and secured thereto.

2. A closure for sealing the open end of a tube comprising a flexible sheet of adhesive material having a width greater than the circumference of said tube, said sheet having an end portion extending about and adhesively secured to the exterior surface of said tube adjacent the open end thereof, the portion of said sheet projecting outwardly from the end of said tube forming substantially a continuation of said tube and being folded back to cause the adjacent inner surfaces to facewisely engage; and laterally projecting tabs, formed on the folded back portion of the sheet, circumscribing the end portion extending about the tube adjacent the open end thereof and adhesively secured thereto.

3. A closure for sealing the open end of a tube comprising a flexible sheet of a width greater than the circumference of the tube, said sheet being formed with an adhesive surface and having an end portion extending about the exterior surface of the tube to adhesively secure the sheet about the tube adjacent the open end thereof, the portion of said sheet projecting outwardly from the end of said tube being provided adjacent the outer edge thereof with a pair of inwardly directed notches forming a pair of oppositely extending tongues, said outwardly projecting portion being collapsed to secure the inner surfaces together and folded back over the end of the tube and the end portion of the sheet circumscribing the same to position said tongues substantially tangent to said tube whereby said tongues may be wrapped about said tube and secured thereto.

4. A sealing closure for closing the open end of a tube comprising a flexible sheet of adhesive material of a width greater than the circumference of the tube, said sheet having an inner end portion thereof wrapped around said tube, adhesive surface inward, providing an adhesively bonded overlap longitudinally of the tube and sheet whereby the outer end portion of the sheet forms a tubular projection beyond the tube which when collapsed forms a single layered wall in the end plane of the tube, and a double layered wall extending outwardly from the tube end in a longitudinal chordal plane of the tube, said double layered wall being folded down against one side of the said single layered wall, said sheet having a projection beyond said outer end portion arranged to be folded over the edge of the tube against, and in bonding relation with, the said end portion of the sheet wrapped around said tube.

5. A sealing closure for closing the open end of a tube comprising a sheet of flexible liquid resistance material, said sheet having an adhesive surface and formed with a pair of inwardly directed notches forming a pair of oppositely extending tongues adjacent an end thereof, the opposite end portion of said sheet being wrapped about the open end of the tube to adhesively secure the sheet to said tube, the portion of the sheet intermediate the end of the tube and said notches being a collapsed tubular projection of the tube having a single layered wall in the end plane of said tube and a double layered wall extending outwardly from the tube end in a longitudinal chordal plane of the tube substantially parallel to the diametral plane of the open end of said tube, said sheet being sufficiently flexible so that said double layered wall may be folded down against the end portion of the sheet wrapped about said tube so that said tongues may be circumferentially extended around said tube in opposite directions and adhesively secured to said tube.

6. The method of sealing the end of a tube with a flexible sheet of adhesive material having a width greater than the circumference of the tube and provided with a pair of inwardly directed notches forming a pair of oppositely extending tongues adjacent and end thereof which comprises the steps of wrapping the opposite end of the sheet around said tube end, adhesive surface inward, to adhesively secure the sheet to the end of said tube; collapsing the tubular projection formed to cause adjacent inner surfaces to adhesively adhere; folding the collapsed tubular projection back on itself to dispose said tongues substantially tangent to the end portion of the sheet wrapped about said tube end; and thereafter extending the said tongues about the end portion secured to said tube to cause the same to adhere to said portion.

7. The closure defined in claim 3 in which said tongues are long enough to meet and overlap; and in addition to said closure, a body of rigid sealing material secured to the outer surface of said tongues at their overlap, said body being irremovable without fracture thereof.

8. The closure defined in claim 1 in which the sheet is a plastic-backed textile material faced with a cleanly separable adhesive adapted for temporarily affixing the closure to the tube and for removal therefrom substantially without leaving any adhesive thereon.

9. A closure for temporarily closing the open end of a tube, comprising when unsecured to the tube: a generally rectangular sheet of flexible liquid-resistant material faced with a cleanly separable adhesive, said sheet being of a width appreciably greater than the circumference of the tube, said sheet being formed with a pair of symmetrically arranged aligned notches of a length approximately one third the width of the sheet extending toward the longitudinal center line of the sheet from the side edges of the sheet adjacent an end edge thereof to provide a pair of oppositely directed transverse tongues, each tongue extending to an edge of said sheet.

SYDNEY H. PHILLIPS.
CARL C. WISBERG.